(12) United States Patent
Wobben

(10) Patent No.: US 6,943,462 B2
(45) Date of Patent: Sep. 13, 2005

(54) RING GENERATOR FOR A WIND POWER INSTALLATION

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 0 days.

(21) Appl. No.: 10/221,380

(22) PCT Filed: Dec. 15, 2000

(86) PCT No.: PCT/EP00/12776
§ 371 (c)(1),
(2), (4) Date: May 13, 2003

(87) PCT Pub. No.: WO01/69772
PCT Pub. Date: Sep. 20, 2001

(65) Prior Publication Data
US 2003/0173935 A1 Sep. 18, 2003

(30) Foreign Application Priority Data
Mar. 11, 2000 (DE) .......................... 100 11 929

(51) Int. Cl.[7] .................................................. H02P 9/14
(52) U.S. Cl. ............................ 290/44; 290/55; 322/28; 322/59
(58) Field of Search ....................... 290/44, 55; 322/35, 322/28, 47, 59

(56) References Cited

U.S. PATENT DOCUMENTS

| | | | | | |
|---|---|---|---|---|---|
| 4,006,398 A | * | 2/1977 | Gritter | .......................... | 322/47 |
| 4,006,399 A | * | 2/1977 | Studtmann | .................... | 322/47 |
| 4,059,771 A | * | 11/1977 | Jacobs et al. | ................. | 290/44 |
| 4,228,361 A | * | 10/1980 | Jacobs et al. | ................. | 290/44 |
| 4,242,628 A | * | 12/1980 | Mohan et al. | ................ | 322/35 |
| 4,293,810 A | * | 10/1981 | Wright | ........................ | 322/28 |
| 4,639,657 A | * | 1/1987 | Frierdich | ...................... | 322/59 |
| 5,023,540 A | * | 6/1991 | Walton et al. | ................ | 322/58 |
| 5,225,712 A | | 7/1993 | Erdman | ........................ | 290/44 |
| 5,587,643 A | * | 12/1996 | Heller | ........................ | 318/321 |
| 5,773,964 A | | 6/1998 | Peter | .......................... | 322/20 |
| 5,798,632 A | * | 8/1998 | Muljadi | ....................... | 322/29 |
| 6,566,764 B2 | * | 5/2003 | Rebsdorf et al. | ............. | 290/44 |

FOREIGN PATENT DOCUMENTS

| | | |
|---|---|---|
| DE | 1 588 508 | 3/1971 |
| DE | 42 18 298 A1 | 4/1993 |
| DE | 197 29 034 A1 | 1/1999 |
| DE | 197 48 479 C1 | 7/2001 |
| GB | 1 243 077 | 8/1971 |

* cited by examiner

Primary Examiner—Joseph Waks
(74) Attorney, Agent, or Firm—Seed IP Law Group PLLC

(57) ABSTRACT

A slowly rotating synchronous generator (ring generator) for a wind power installation, the generator having a rotor and a stator surrounding the rotor, and the stator having at least one three-phase current winding on which a capacitive current is impressed, and the generator having a part of the exciter power of the generator produced by the stator.

6 Claims, 10 Drawing Sheets

Phase voltages

Capacitive filter current of the 6 phases

Two separate three-phase current systems $U_1V_1W_1$ and $U_2V_2W_2$

RING GENERATOR FOR A WIND POWER INSTALLATION

BACKGROUND OF THE INVENTION

1. Field of the Invention

A slowly rotating synchronous generator for a wind power installation and, more particularly, a ring generator having a circuit for inducing a current in a stator of the generator.

2. Description of the Related Art

Slowly rotating electrical machines, for example ring generators, as are used in the wind power installations from Enercon of types E-33, E40, E-12 and E-66, require very high excitation power. The excitation power required rises with the number of poles, with a rising air gap, and with the level of the reactive power.

Ring generators of the above-indicated kind have, for example, 72 or 84 poles. The efficiency of directly driven generators for use in the area of wind power should be as high as possible because they are in operation as far as possible for 24 hours a day.

Slowly operating ring generators for wind power installations, such as, for example, those of type E-66 from Enercon, operate at the rotary speed range of between 10 and 22 rpm. Such a ring generator is constructed for example with 72 poles (36 pairs of poles) and thus produces a frequency of between 6 and 13.2 Hz.

Such a ring generator comprises a rotor, through the windings of which the excitation power is built up, and a stator that surrounds the rotor. Compensation in respect of the reactive power or overcompensation of the stator with capacitors is very expensive because, as described above, the frequency is very low.

The capacitor current is generally calculated in accordance with the formula:

$$i_c = C \cdot \frac{du}{dt}$$

In that respect, for sinusoidal voltages (as in the case of known generators), there is a capacitor current of $$i_c = U \cdot 2 \cdot \pi \cdot f \cdot C$$

The capacitor current is therefore determined by the voltage, the capacitance of the capacitors, and the applied frequency.

With a generator frequency of, for example, between 6 and 13.2 Hz, there is unfortunately only a small capacitor current in comparison with a conventional frequency of 50 or 60 Hz. The sinusoidal capacitor current admittedly involves a phase shift of 90° relative to the active current, but it flows in each case over a range of 180° and in that situation causes increased copper losses in the stator winding.

German Patent DE 42 18 298 discloses a permanently excited generator system, wherein a synchronous generator has a rotating magnetic field that is regulatable by way of a voltage detector for detection of the output voltage of the permanently excited synchronous generator and a comparator for comparing the detected voltage by means of the voltage detector to a reference voltage which can be set by means of a voltage setting device.

U.S. Pat. No. 5,773,964 discloses a regulating system for an automobile generator.

BRIEF SUMMARY OF THE INVENTION

The disclosed embodiments of the present invention improve the efficiency of directly driven generators of the above-described kind and avoid the above-described disadvantages.

In accordance with one embodiment of the invention, a slowly rotating synchronous generator (ring generator) for a wind power installation is provided, the generator having a rotor (rotor member) and a stator surrounding the rotor, and the stator having at least one three-phase current winding on which a capacitive current is impressed or in which a part of the exciter power of the generator is produced by the stator or both.

In accordance with another aspect of the present invention, the foregoing generator is a multi-phase generator that includes a circuit provided between the individual phase conductors of the stator winding for reducing the exciter current. Ideally the circuit includes capacitors or filter circuits or both for providing a stator current.

In accordance with a further aspect of the present invention, the voltages induced in the stator are of a substantially trapezoidal configuration as depicted in a voltage-time diagram.

In accordance with yet a further aspect of the present invention, the stator winding has at least two three-phase current systems or three-phase windings that are respectively displaced with respect to each other through 30°.

DETAILED DESCRIPTION OF THE INVENTION

The disclosed embodiments of the present invention involve the technological approach that a part of the exciter power of the generator is applied not only by the rotor (or the winding thereof but also by the generator or the three-phase current winding thereof.

Preferably, in this case the stator is excited with a capacitive current.

Figure 3:
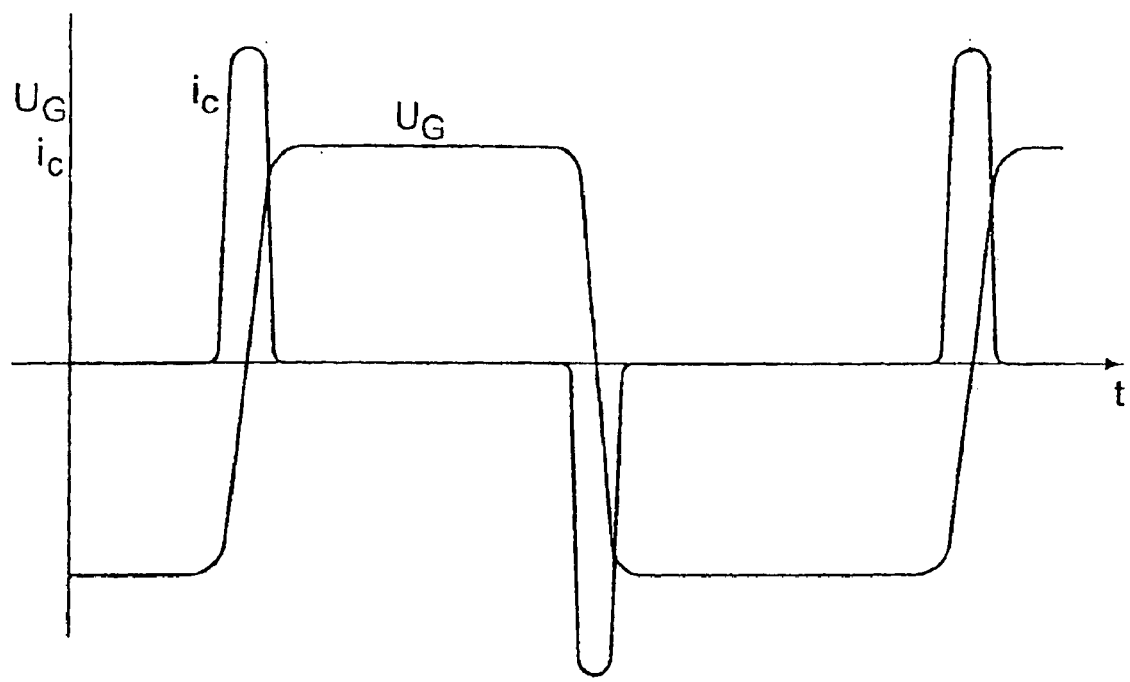
FIG. 3 is a graph of the capacitor current with a trapezoidal voltage.

In this case the voltage induced in the stator is not sinusoidal in form but is in the nature of a trapezium, as shown in FIG. 3. Then, with the trapezoidal voltage, the capacitive capacitor current flows only during the positive or the negative edge of the voltage in accordance with the formula:

$$i_c = C \cdot \frac{du}{dt}$$

The current pulses which occur in that situation are of a frequency in the range of about 100 Hz and 180 Hz, and preferably 130 Hz, and affords a current amplitude that is higher approximately by a factor of 10 than when a sinusoidal voltage is involved.

Figure 4:
FIG. 4 is a graph of the capacitor current and the load current.

A further major advantage of the generator according to the invention is also that the capacitive current flows at the beginning of the entire half-oscillation. This means that the capacitive current 100% corresponds to an exciter current, which can thus be reduced according to the rotor. In addition that current loads the stator winding only when there is still not a high load current loading the winding, as shown in FIG. 4. It is desirably provided that the generator stator is designed with (at least) two three-phase current windings, which in turn each comprise a three-phase winding. In that arrangement the three-phase current windings are displaced through a phase angle of 30°, which is shown in FIG. 5.

Figure 6:
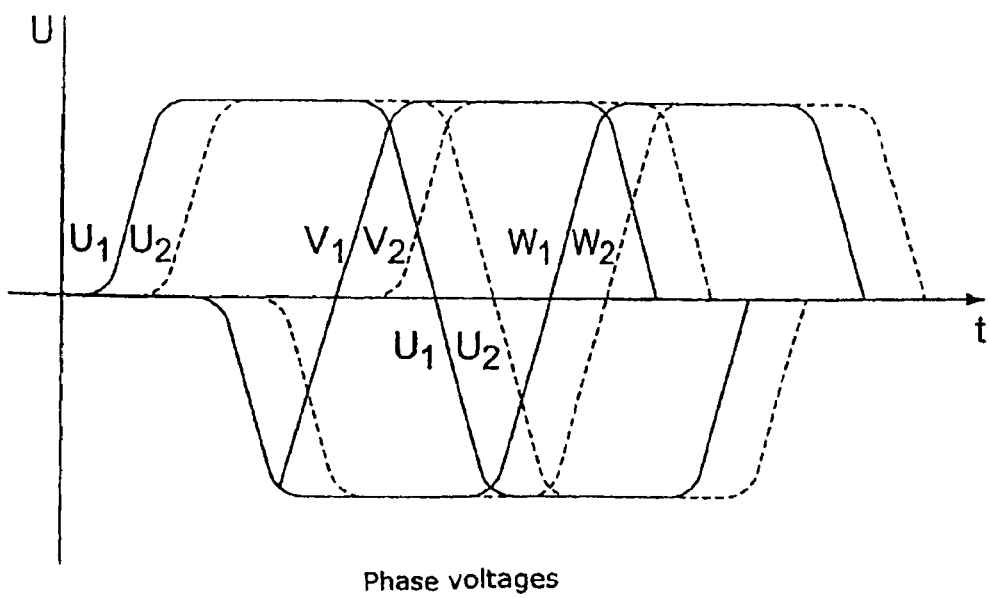
FIG. 6 is a graph illustrating the phase relationship of the output of the generator of FIG. 5.

With that arrangement the next phase starts in each case after 30°, with a fresh oscillation. FIG. 6 shows the phase relationship over 360°.

Figure 5:
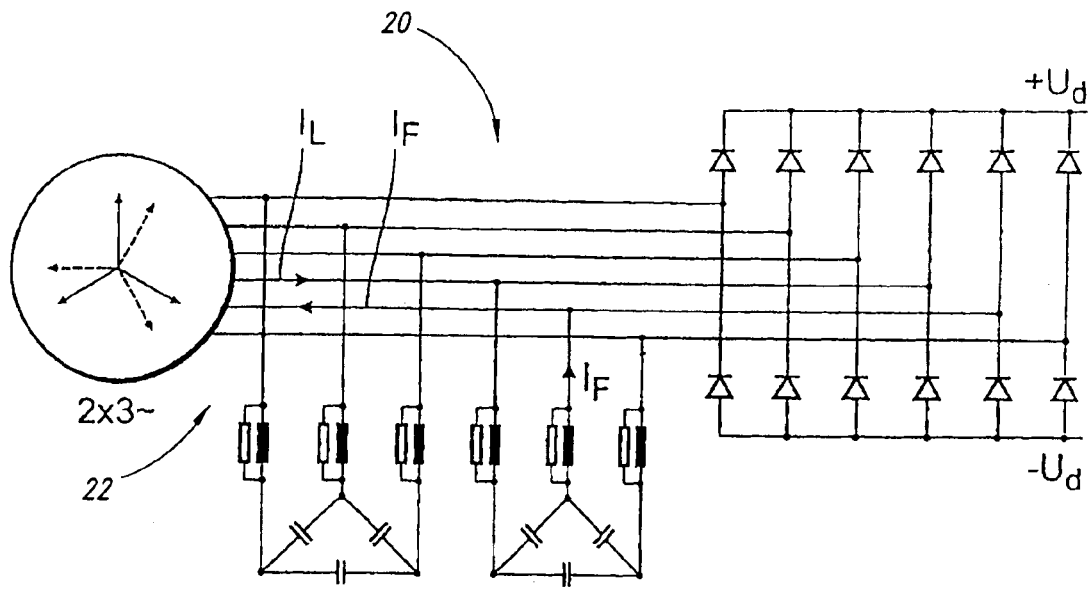
FIG. 5 is a schematic illustration of a synchronous generator having at least two three-phase current systems.
Figure 7:
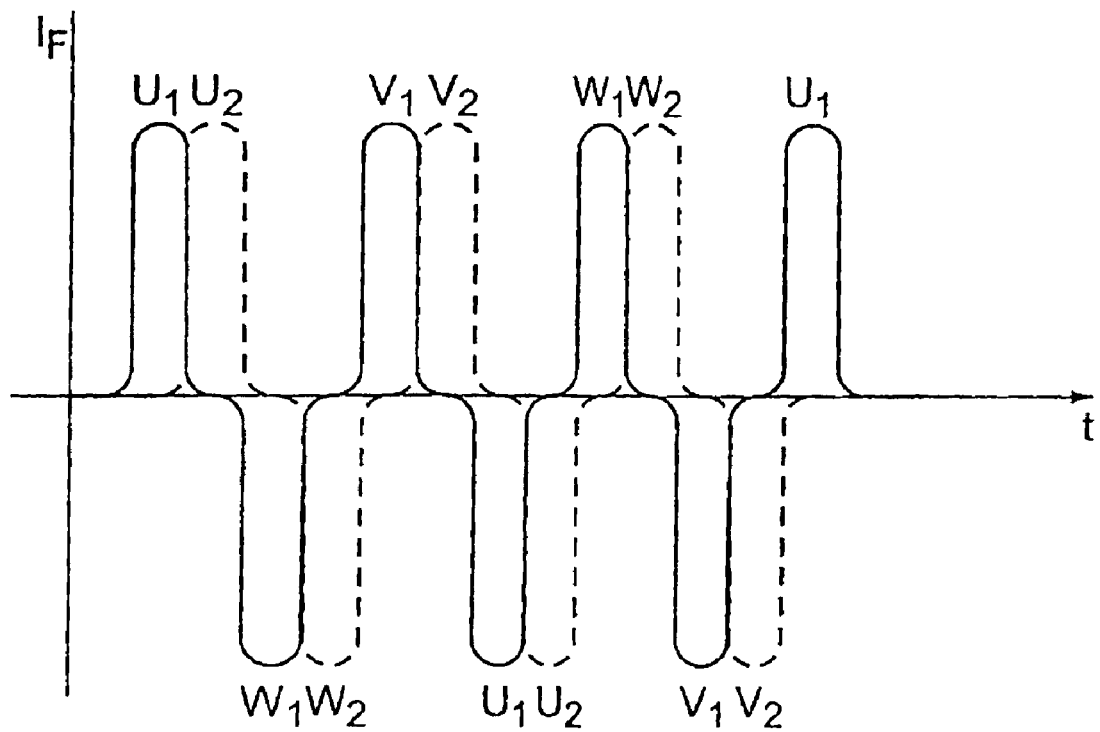
FIG. 7 is a graph illustrating in relation to a time axis the capacitive exciter currents in the stator of the three-phase current systems depicted in FIG. 5.

FIG. 7 shows in relation to the time axis the capacitive exciter currents in the stator of the two three-phase current systems depicted in FIG. 5. It will be seen that every 30° electrical a fresh current pulse is delivered by the capacitors (see FIG. 5). This filter is so designed that it supplies the capacitive current peaks for the generator stator, in addition the required currents by overshoots (harmonics), which the rectifier requires.

The advantages of the construction according to the invention can also be shown by comparison with the generators hitherto, in which the exciter power is produced solely by the rotor. In the previous structure involving production of the exciter power by the rotor alone, there are approximately 20% induction losses. This means in accordance with the formula $p=i^2 \cdot R(100\%+20\%=1.2)$ there will be losses of $1.2^2$. In principle in previous generators it is not possible to avoid that loss component because the pole pieces cannot be at an infinite distance from each other, and the loss of 20% is produced by the mutually juxtaposed pole pieces, insofar as magnetic loss goes from one pole piece directly into the other by way of the air gap between the pole pieces.

If now, however, exciter power is also produced by the stator, then such losses no longer occur in that produced part of the exciter power. This means also that the part of the exciter power produced by the stator contributes 100% to the power. Overall, therefore, the exciter power of the rotor can be reduced somewhat so that the loss component already goes down due to the stator exciter power, because of the freedom from loss thereof. Due to the reduction in exciter power from the rotor, however, stray inductance is also reduced so that the 20% loss component, which occurred hitherto, is reduced once again.

Figure 8:
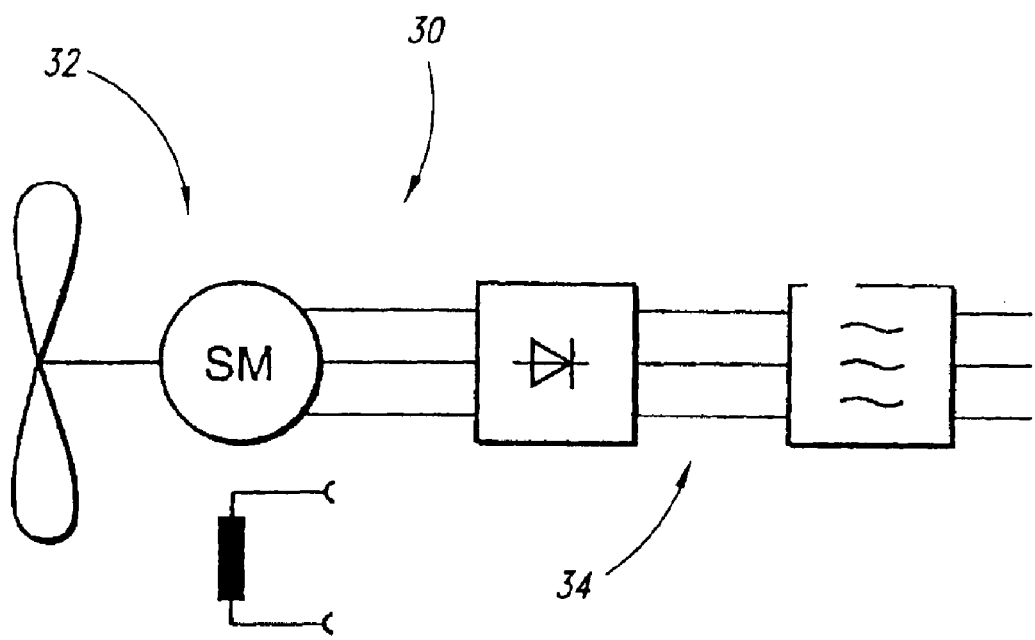
FIG. 8 is a block diagram of a wind power installation having a synchronous machine and downstream-connected inverter formed in accordance with the present invention.

FIG. 8 shows a block circuit diagram of a wind power installation 30 having a synchronous machine 32 and a downstream-connected inverter 34.

Figure 9:
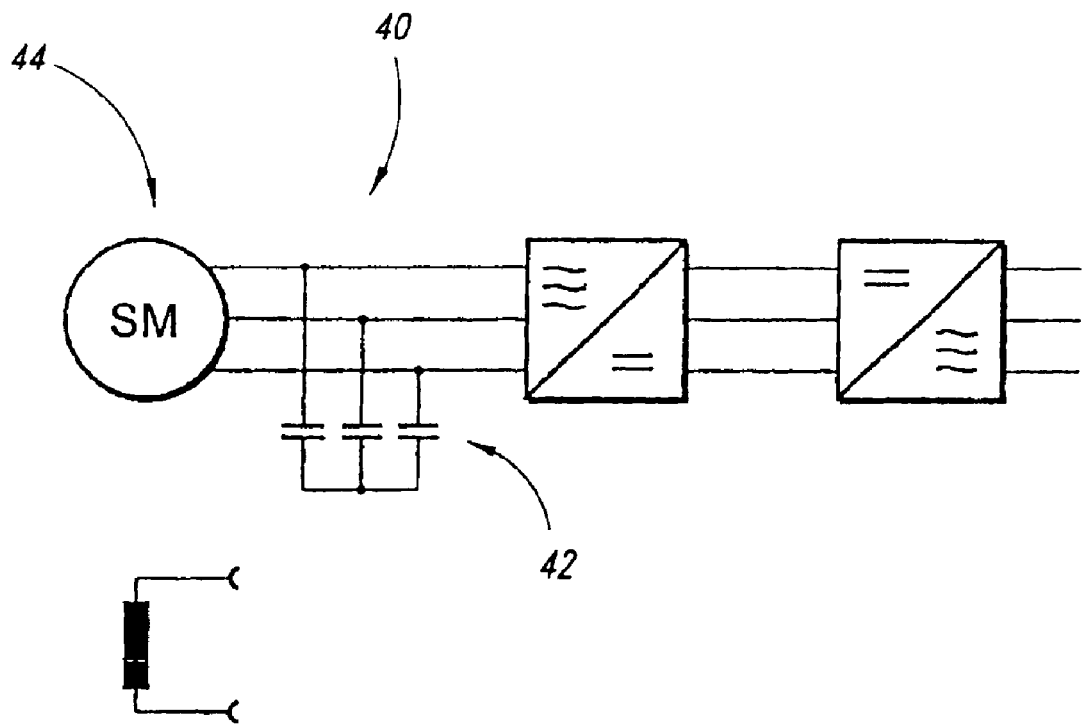
FIG. 9 is a block diagram of a wind power installation in accordance with the present invention in which a capacitive network is connected in a star point circuit to the windings of a simple three-phase current system.

FIG. 9 shows a block circuit of a wind power installation 40 according to the invention in which a capacitance network 42 is connected in a star point circuit to the windings of a simple three-phase current system 44.

Figure 14:
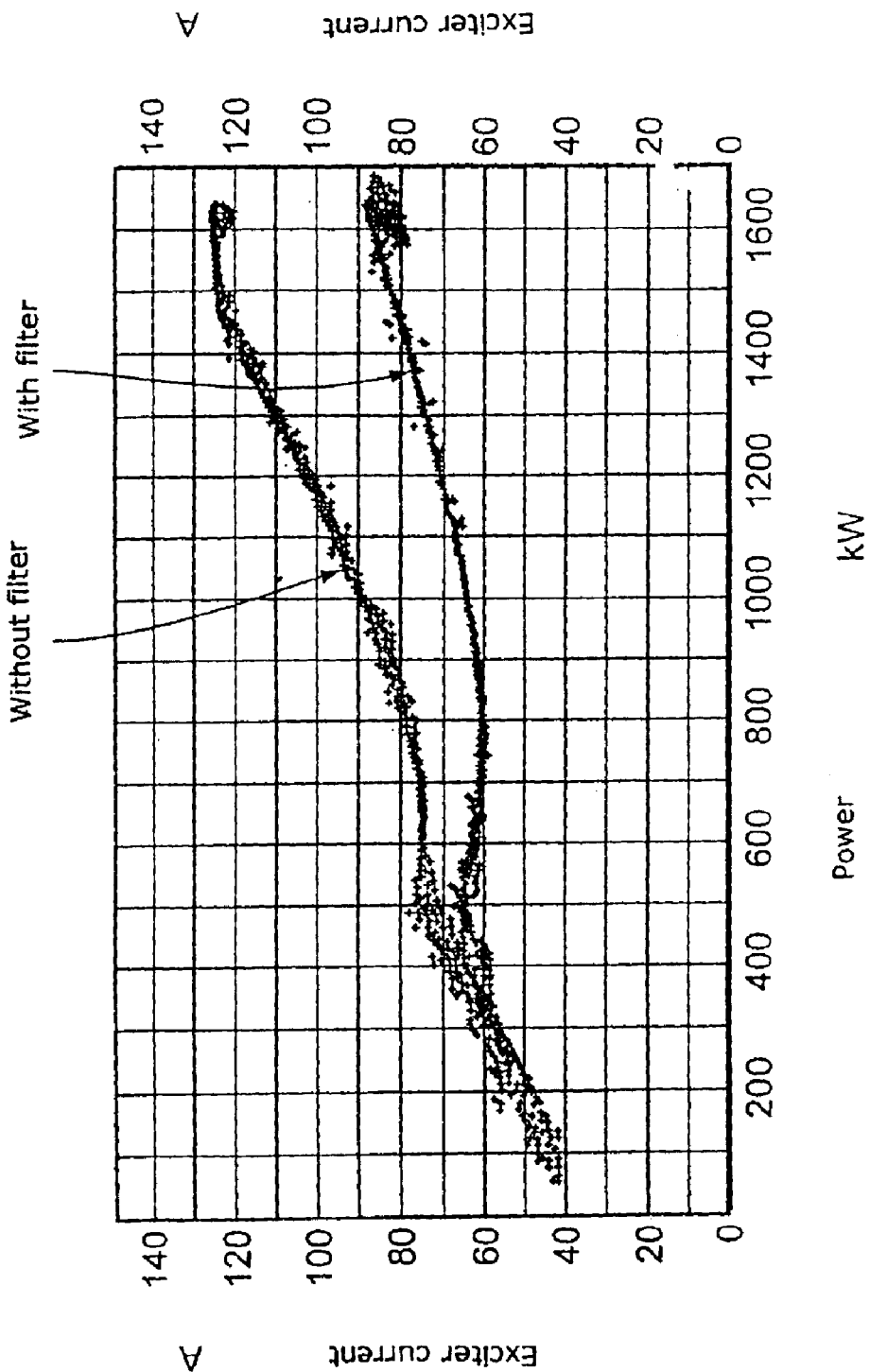
FIG. 14 is a graph of curve plots illustrating the required excited current in relation to respective delivered power of a generator formed in accordance with the present invention.

A further advantage of the structure according to the invention can also be seen in FIG. 14. FIG. 14 shows the required exciter current in relation to the respective delivered power of the generator. The upper curve shows the energy demand without filter. The lower curve with an approximately 20% reduced exciter current shows operation with the structure according to the invention.

A reduction in the exciter current by about 20% produces an exciter power in the pole wheel or rotor, which is about 36% less. That represents a large reduction in the power loss of the rotor. In that way it is possible to increase the generator power. In the case of generators with a rated rotary speed of about 20 rpm, it is primarily the rotary speed and thus the dφ/dt or induction B in the air gap, that determine the structural size. In that way the rated power of previous generators, as in the case of wind power installations of type E-66 from Enercon (rated power 1.5 MW) can be increased to 1800 kW.

Figure 1:
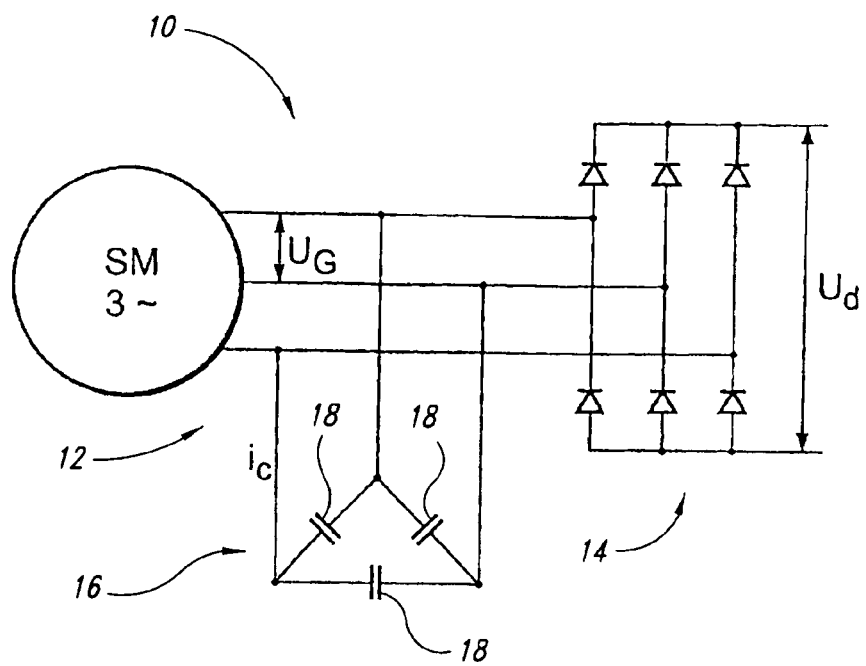
FIG. 1 is a schematic illustration of a generator formed in accordance with the present invention.
Figure 2:
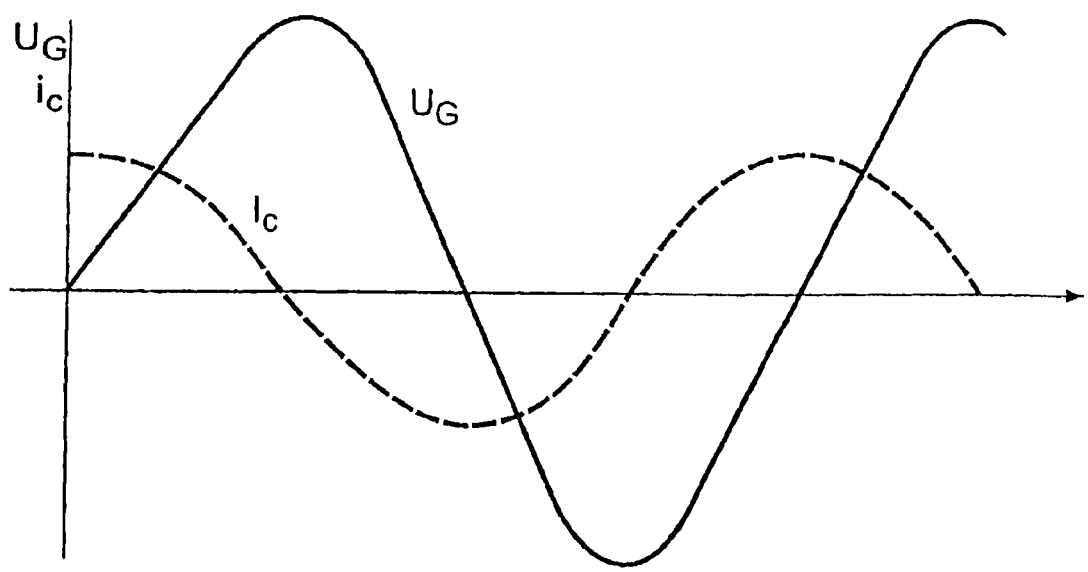
FIG. 2 is a current-time diagram of the output of the generator of FIG. 1.

FIG. 1 shows a generator 10 (synchronous machine SM) with a three-phase current system 12 to which a rectifier 14 is connected. Connected in the three-phase conductor system 12 is a capacitance network 16 comprising three capacitors 18 in a delta circuit. The voltage $U_G$ is applied across the individual conductors of the three-phase winding. With a sinusoidal conductor voltage, a displaced sinusoidal current $i_c$ is produced, as is shown in FIG. 2.

FIG. 3 shows the capacitor current with a trapezoidal voltage. FIG. 4 shows the configuration of the capacitor current $i_c$ and the configuration of the load current $i_L$ in the current-time diagram.

Figure 10:
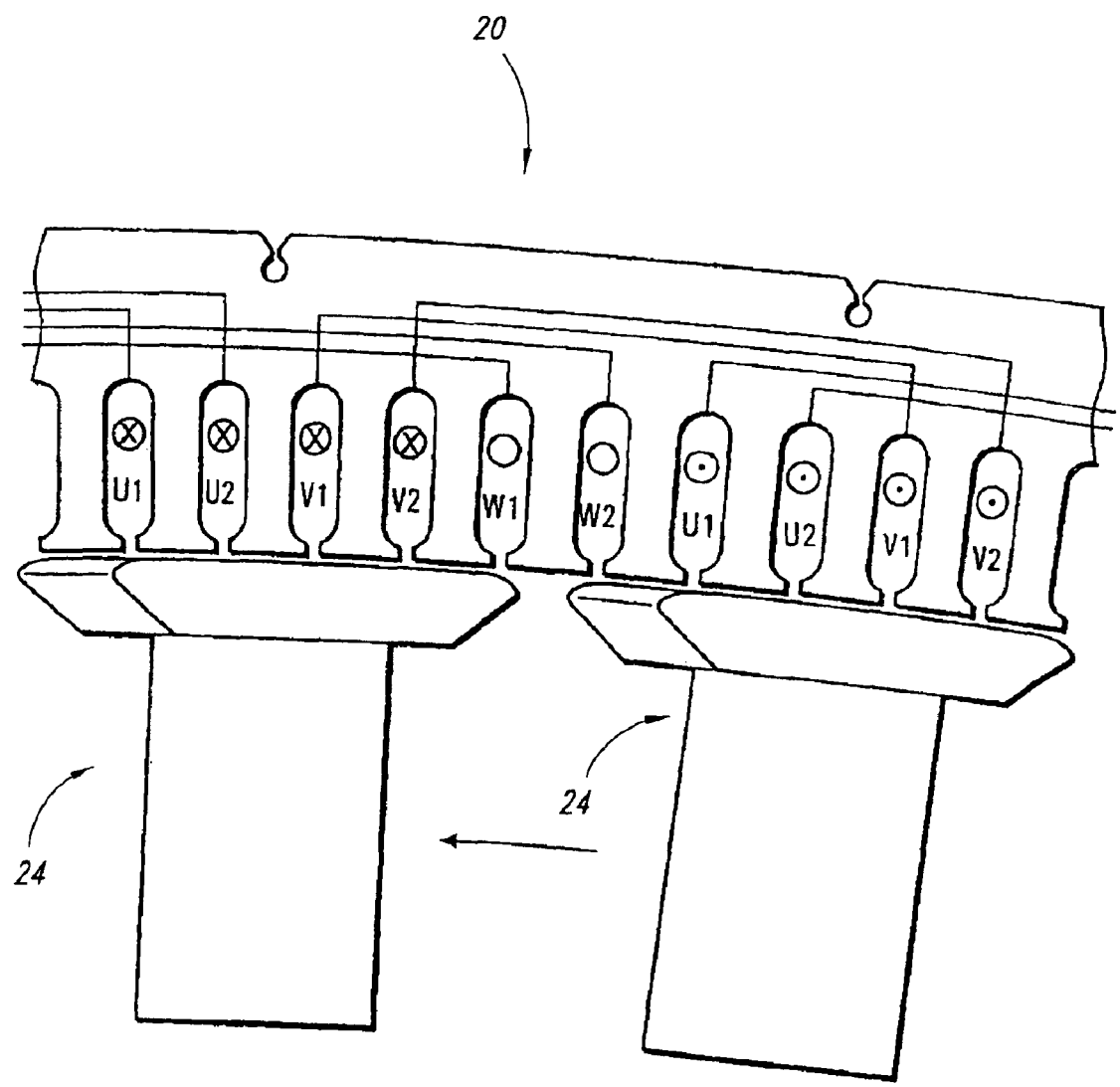
FIG. 10 is a partial cross-sectional view of a slowly rotating synchronous generator formed in accordance with the present invention.

FIG. 5 shows the structure of a synchronous generator 20 (ring generator) having at least two three-phase current systems 22, wherein each individual three-phase current system 24 has three three-phase current windings 26. Both three-phase current systems are displaced relative to each other through about 30°. That is also shown with reference to FIGS. 10 and 11. FIG. 10 is a view in cross-section through a part of the extent of the slowly rotating synchronous generator 20 according to the invention. In this case the rotor rotates within the stator.

Figure 11:
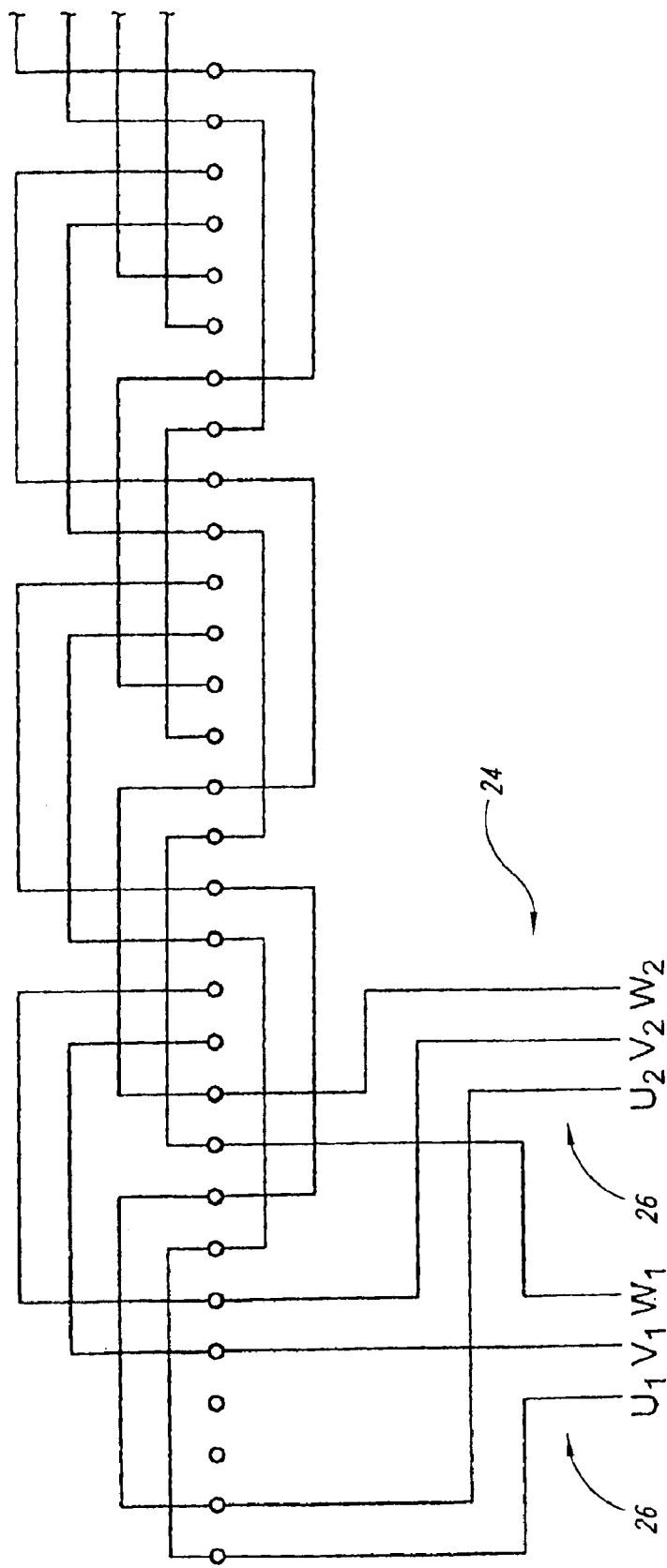
FIG. 11 is a schematic overview of the arrangement of individual phases of different three-phase current systems over a region of a stator formed in accordance with the present invention.

In addition, as shown in FIG. 11, there are two independent three-phase current windings $U_1$, $V_1$, $W_1$ and $U_2$, $V_2$, $W_2$ in the stator. The power of the generator is thus distributed to both three-phase current windings (three-phase current systems) so that each three-phase current system has to take over only 50% of the rated power. Both three-phase current systems are displaced through an electrical angle of 30° and are thus electrically and mechanically (spatially)

isolated from each other. This means that the reactance $X_D$ is also approximately doubled and thus the short-circuit current is halved. This has the advantage that, in the event of a possible short-circuit in a three-phase current system, only half the short-circuit power can occur. This permits a reduction in the maximum short-circuit moment (short-circuit of two phases, for example between $U_1$, and $V_1$) by 50% in relation to a system arrangement in accordance with the state of the art.

FIG. 11 is a simple overview of the arrangement of the individual phases of the different three-phase current systems over a larger region of the stator.

Figure 12:
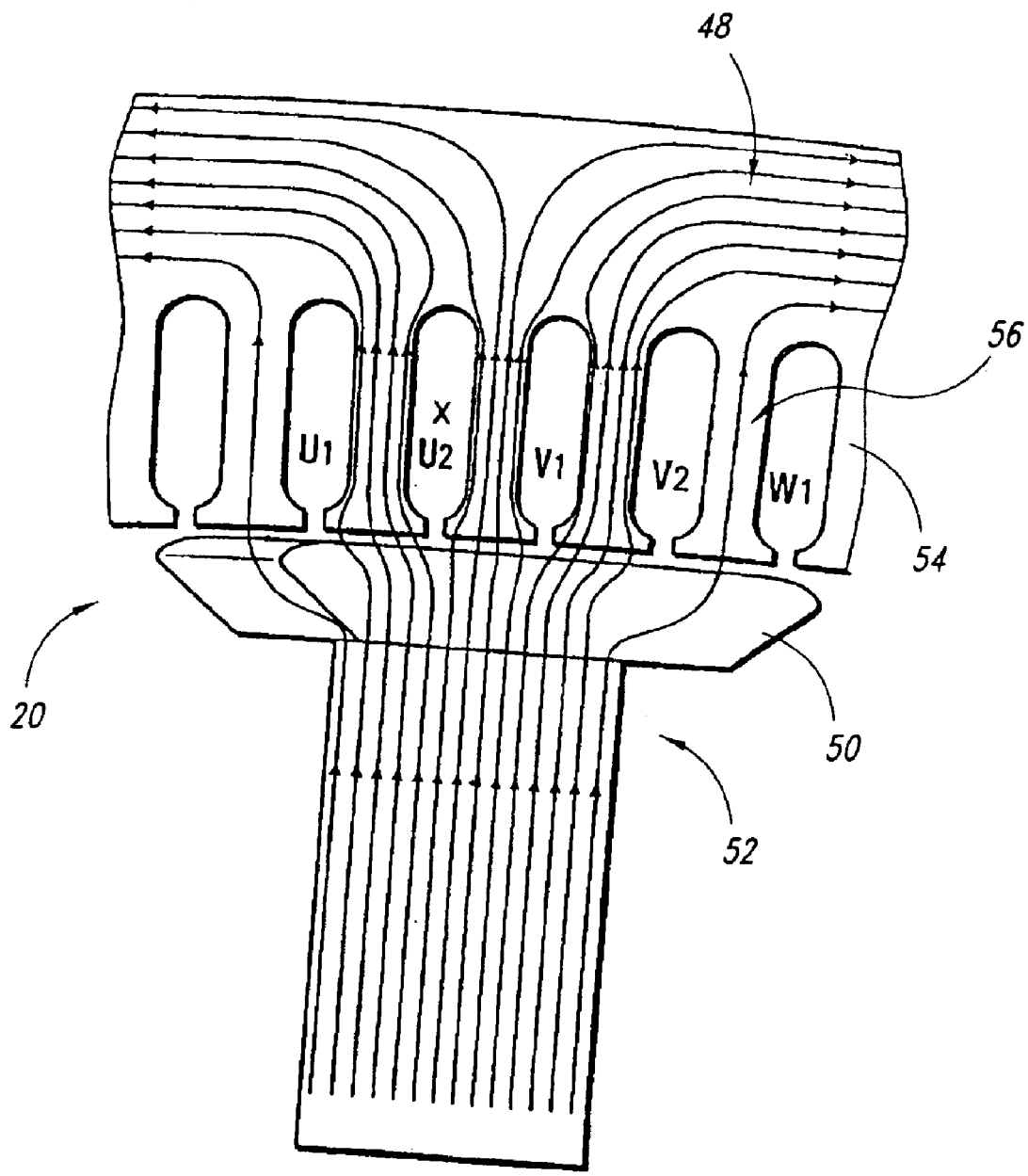
FIG. 12 illustrates the magnetic flux in a generator formed in accordance with the present invention.

FIG. 12 shows the magnetic flux in the generator 20 according to the invention (rotor–>stator). In this arrangement, the magnetic flux 48 goes directly from the pole head 50 of the rotor 52 to the stator 54 uniformly between the grooves 56.

Figure 13:
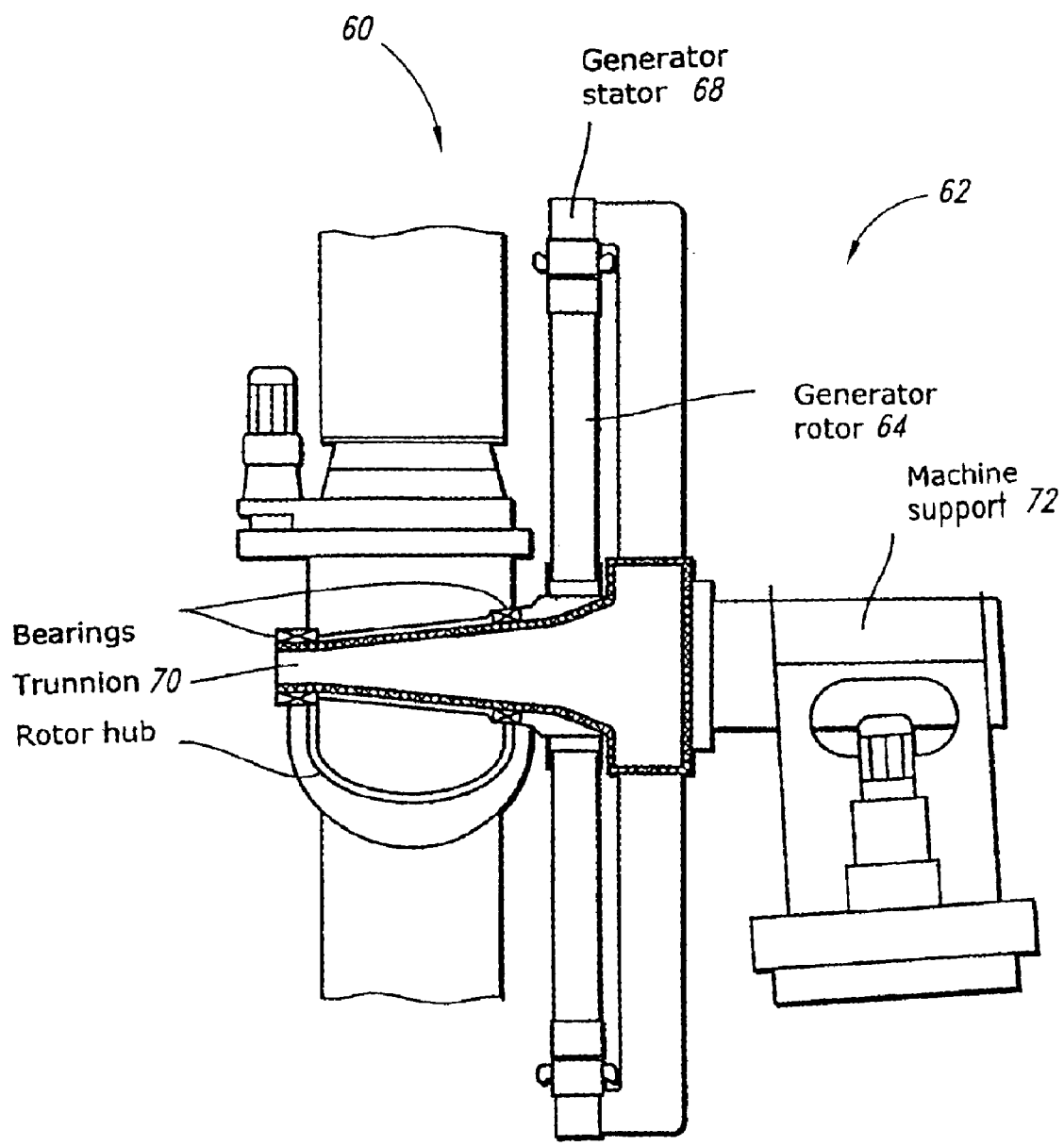
FIG. 13 is a cross-sectional view of a wind power installation pod having a synchronous generator formed in accordance with the present invention.

FIG. 13 shows a view in cross-section of a wind power installation pod 60 with a synchronous generator 62 according to the invention. In this case the rotor 64 of the generator is flange-mounted to the rotor of the wind power installation and the generator rotor and the wind power installation rotor are supported on a trunnion. The wind power installation rotor is accordingly connected without a transmission and without a shaft directly to the rotor of the synchronous generator. The generator rotor is disposed within the generator stator 68 which is flange-mounted directly to the trunnion 70. The trunnion 70, like the entire drive train mounted thereon, besides the generator, is held by a machine support 72.

Due to the design configuration of two three-phase current windings of the generator, there are means which always limit the short-circuit torque which occurs in the event of a short-circuit at a stator winding, to a maximum of four times the rated torque, preferably twice the rated torque. The short-circuit torque can also always be less than double the rated torque. It is also possible for the generator rotor to be designed without a damping cage or a damping winding.

It will be appreciated that it is also possible to apply the arrangement according to the invention in relation to permanently excited generators.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims, and the equivalents thereof.

I claim:

1. A rotating synchronous generator, in particular a ring generator, for a wind power installation, comprising:
   a rotor,
   a stator surrounding the rotor, wherein the stator has at least one three-phase current winding, and
   a compensation unit comprising capacitors, inductors and damping resistors, which are connected to the stator for impressing a capacitive current into the stator and/or for producing a part of the exciter power of the generator by a capacitive current, the capacitors, inductors and damping resistors of the compensation unit being selected to provide a rectifier connected downstream of the generator with a harmonic power, wherein the voltages induced in the stator are of a substantially trapezoidal configuration.

2. The synchronous generator according to claim 1 wherein the synchronous generator is a multi-phase generator and that means for reducing the exciter current are provided between the individual phase conductors of the stator winding.

3. The synchronous generator according to claim 2 wherein the means for reducing the exciter current are provided by capacitors and/or filter circuits for providing a stator current.

4. The synchronous generator according to claim 1 wherein the stator winding comprises at least two three-phase windings which are respectively displaced with respect to each other through 30°.

5. The compensation unit according to claim 1 wherein the compensation unit supplies a sixth current harmonic for the stator.

6. The synchronous generator according to claim 1 wherein the generator is a permanently excited generator.

* * * * *